March 1, 1960     R. P. FRIED     2,926,620
ICE CREAM SCOOP
Filed Oct. 22, 1956
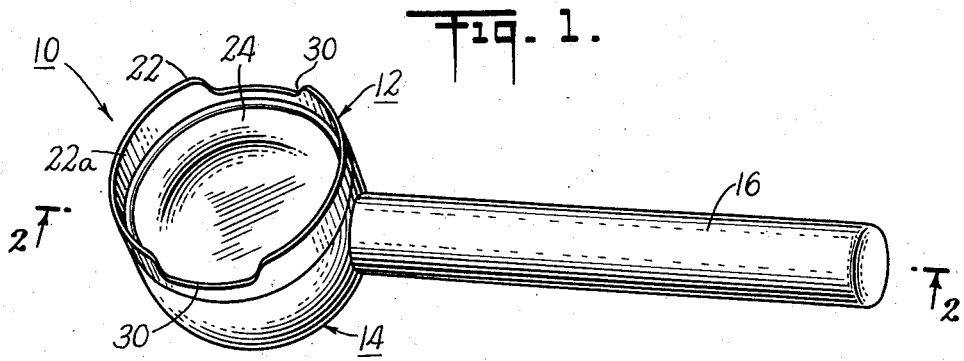
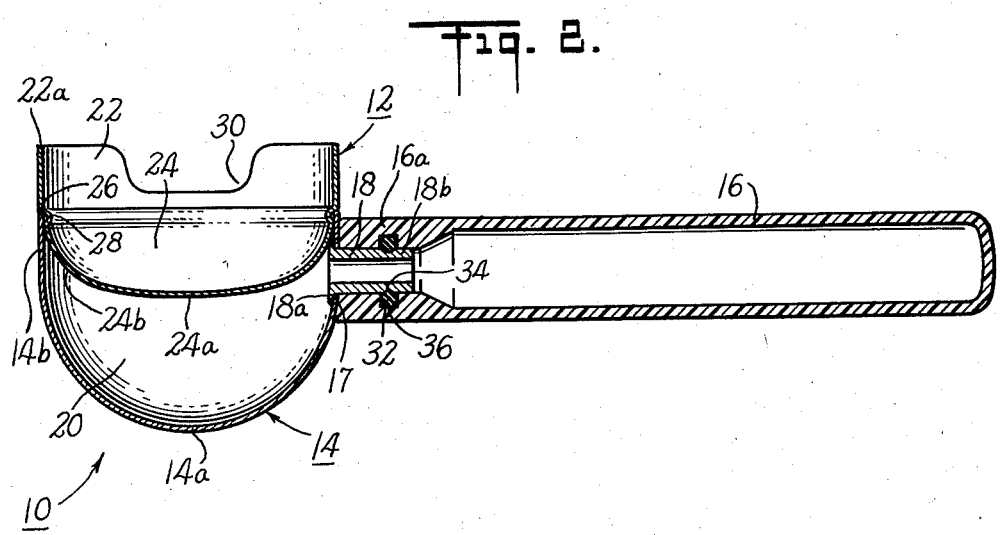
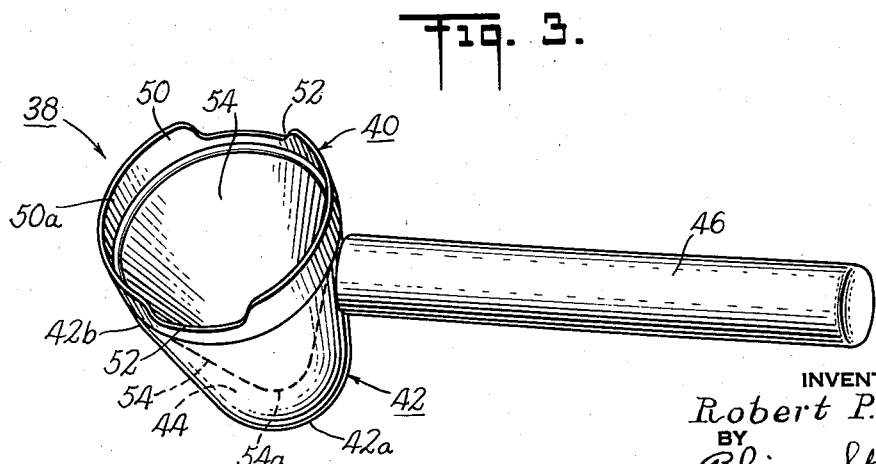
INVENTOR
Robert P. Fried
BY
Blair + Spencer
ATTORNEYS

United States Patent Office 2,926,620
Patented Mar. 1, 1960

2,926,620

ICE CREAM SCOOP

Robert P. Fried, Staatsburg, N.Y., assignor to Modern Machine & Tool Co., Inc., Staatsburg, N.Y.

Application October 22, 1956, Serial No. 617,644

1 Claim. (Cl. 107—48)

This invention relates to an improved scoop for removing portions from a congealed mass of ice cream or the like. More particularly, it relates to a scoop having a liquid core which maintains the inside surface of the scoop at a temperature above the melting point of ice cream, thereby permitting the ice cream to be readily removed therefrom.

Ice cream keeps best when stored at a maximum temperature of from zero to 8°. At this temperature it is relatively hard and thus it is difficult to separate portions therefrom. Therefore, it has long been the practice in obtaining a serving from a container of ice cream to use a scoop whose temperature is above the melting point of the ice cream. As the scoop is drawn into and through the mass of ice cream in the container, the edge of the scoop melts a small amount of ice cream adjacent thereto which facilitates severing the portions to be removed. The older single-wall scoops were dipped in water to warm them, and, since the severed portion of ice cream lowered the temperature of the scoop below the melting point of the ice cream with resulting adherence of the serving to the scoop, a mechanical ejector was provided for removing the serving therefrom. The scoop then had to be re-dipped in water to warm it before using it again. This constant dipping in water, in addition to being unsanitary, caused water to be deposited in the ice cream where it froze to ice to damage the ice cream. Moreover, even with the water dipping process, single-wall scoops were difficult to use when the ice cream was kept at a desirably low temperature; consequently, the temperature of the ice cream was often raised to make it easier to serve. However, this resulted in compression of the ice cream and variation in the portions being served. To avoid these problems, a double wall scoop has been used in which a chamber between the walls is filled with a liquid of relatively high specific heat and the scoop is made of a material which is a good heat conductor. During the scooping operation, the liquid heats the cutting edge of the scoop to maintain it at a temperature above the melting point of ice cream and thus facilitate scooping. The liquid also maintains the inside surface of the scoop at such a temperature above that of the ice cream so that the serving melts slightly and does not tend to adhere to the scoop; it thus may be ejected from the scoop by merely inverting it. Because of the high heat capacity of the liquid core, the scoop may be used over and over again without external heating.

Heretofore, double-walled scoops of this type have been made by casting aluminum using a sand core molding or die casting process. However, scoops made of aluminum are attacked by lactic and fruit acids in ice cream, which results in pitting of the aluminum scoop bowls, rendering them difficult to keep clean and sanitary. Also, the aluminum of the scoop sometimes reacted with impurities in the liquid core to release gas, resulting in a build-up of internal pressure within the double-walled portion of the scoop. To withstand this internal pressure and to prevent scoop explosion, the wall sections were made relatively thick. Also, aluminum scoops, after casting, had to be polished to give a desirable smooth surface and shiny appearance, which added to the cost of manufacture thereof. It is not possible to cast metals which do not need polishing after being formed and which are not attacked by the substances in ice cream or the liquid core, e.g. stainless steel in sufficiently thin wall sections to obtain the required heat transfer from the liquid core. A much thinner wall section for these materials is required, as compared to aluminum, since they have poorer thermal conductivity, and also because thicker material results in a heavy, unwieldly scoop. When formed in thick sections, even a light metal such as aluminum provides a scoop which is slightly heavier than conventional single-walled scoops.

Accordingly, it is an object of this invention to provide an improved scoop for frozen materials such as ice cream or the like having a double-wall bowl of stainless steel. It is another object of my invention to provide a scoop of the above character in which the stainless steel is sufficiently thin to conduct heat quickly from a liquid core to the material holding surface of the bowl. It is another object of my invention to provide a scoop of the above character which is light in weight. It is a further object of my invention to provide a scoop of the above character in which the bowl has a cutting edge sufficiently thin to efficiently separate a portion of controlled size from a mass of congealed material such as ice cream or the like. Yet another object of the invention is to provide a scoop of the above character which is susceptible of low cost manufacture. A further object of this invention is to provide a scoop of the above character which may be made of prepolished materials. A final stated object of my invention is to provide an improved low cost method of making a scoop of the above character. Other objects of the invention will in part be obvious and will in part appear hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claim.

For a fuller understanding of the nature and objects of the invention, reference should be had to the following detailed description taken in connection with the accompanying drawings in which:

Figure 1 is a perspective view of an ice cream scoop made according to my invention, Figure 2 is a vertical section taken along the line 2—2 of Figure 1, and Figure 3 is a perspective view of another embodiment of an ice cream scoop made according to my invention and designed to provide conical shaped servings.

In general, my scoop has a two piece bowl generally indicated at 10 (Figure 1) with an inner member generally indicated at 12 for severing and retaining a serving of ice cream and an outer cup 14 fitting about the inner member, and shaped to provide a chamber therebetween. The flange portion of the inner member forms a cutting edge which, when drawn through a mass of ice cream separates a serving therefrom, which is then guided into a cup portion where it is retained until deposited on an ice cream cone or dish, etc. The seal between the inner and outer members is liquid-tight so that the chamber formed between these parts retains a liquid in thermal contact with the inner member. A handle 16 secured to the outer cup preferably has a hollow interior communicating with the liquid holding chamber to provide extra space for liquid; and thus permit the liquid to circulate in the interior of the scoop, thereby facilitating heat transfer from the liquid to the metal scoop walls.

In the manufacture of the scoop, the inner and outer members may both be made of such conventional processes as drawing, spinning, etc., and thus may be of stainless steel or other materials suitable for use. Preferably these materials are of the so-called "prepolished" type, thus requiring no polishing of the assembled scoop. The outside cup is preferably joined to the inner member by welding at its edge or rim below the flange portion to form a liquid-tight seal. Next the handle, which may be molded from a plastic or other suitable material, is attached to a nipple previously inserted in the wall of the outer cup, the liquid-holding chamber between the cups having been filled with a suitable liquid. It is thus seen that my improved scoop may be readily assembled at low cost from parts formed by well-known techniques and with a minimum of skilled labor.

More particularly, referring to Figures 1 and 2, in my improved ice cream scoop the handle 16 is connected to outer cup 14 by a nipple 18 (Figure 2) secured thereto. Thus between members 12 and 14 there is formed a chamber 20 communicating with the hollow interior of handle 16 by ways of nipple 18. Inner member 12 is generally circular in lateral cross-section and thus may be readily formed by drawing, spinning, etc., it has a flange portion 22 and an interior cup portion 24, an annular shoulder 26 being formed therebetween on its outer surface. Preferably an annular groove 28 is formed in the exterior surface of the member 12 substantially adjacent shoulder 26 for a purpose to be hereinafter described. Flange portion 22 is thin so that its front edge 22a may easily cut into frozen ice cream during scooping. That portion of the inner member forming cup portion 24 is also thin to facilitate heat conduction from the liquid chamber 20. The sides of flange 22 have cut out portions 30 which aid in the ejection of a serving from the scoop in a manner to be described. The bottom 24a of the cup portion 24 is substantially flat to aid in ejecting servings from member 14 as will be more fully described.

As best seen in Figure 2, outer cup 14 has a bottom portion 14a generally hemispheric in form extending upwardly to merge with a generally cylindrical upper portion 14b whose outside diameter is preferably equal to that of flange portion 22. The upper portion of cup 14 is shaped and dimensioned to fit snugly over groove 28 and against shoulder 26. In other words, the depth of shoulder 26 should be equal to the thickness of portion 14b so that the cup presents a substantially smooth exterior surface at the juncture with member 12. Cups 14 may be secured to inner member 12 by swaging the upper edge of the outer cup into groove 28 or welding it therein to provide a seal against the escape of the liquid contained in chamber 20. The outer cup should be deep enough to provide a chamber 20 capable of holding sufficient liquid for efficient operation; yet it should not interfere with the scooping operation. As an example, I have found that for a standard 2½ ounce No. 16 scoop having an inner cup depth of 1⅜ inches, a suitable depth for cup 14 is 1⅝ inches.

Nipple 18 extends through an aperture 17 in outer cup 14 and is secured therein by a flange portion 18a, which is welded or otherwise attached to cup 14. An O-ring gasket 32 is seated in an annular groove 34 encircling shank portion 18b of the nipple, and is compressed between this groove and a coextensive internal annular groove 36 in reduced portion 16a of handle 16. Thus gasket 32 serves to lock the handle to the bowl-nipple assembly and provide a liquid-tight seal between the nipple and the handle. Handle 16, whose hollow interior communicates with chamber 20 through nipple 18 may be formed in any suitable manner from a number or plastic materials, e.g. polyethylene, polystyrene, etc.

In the assembly of my scoop, the nipple 18 is first secured to outer cup 14. The outer cup is then secured to inner member 12 by swaging or welding the upper edge of cup 14 to groove 28. Chamber 20 is then filled with a liquid of relatively high specific heat and low freezing point through nipple 18. In practice, I have found that a solution of water and a non-toxic antifreeze, to which a buffer solution may be added, is a liquid having such desired characteristics. Finally, handle 16 is attached to the bowl by forcing it over shank 18b of nipple 18 and O-ring 32 until groove 36 snaps over the O-ring to lock in place. Cutout portions 30 may be removed from member 12 at any desirable stage of the process by any suitable method, e.g. cutting, grinding, etc. Thus it will be seen that the formation of the various parts of the scoop and the assembly of these parts can be accomplished at low cost and without the use of highly trained personnel. Moreover, the parts of bowl 10 may readily be formed in relatively thin sections of stainless steel where desired, all of the metallic parts preferably being of the same material to avoid corrosion from electrolytic action.

In use, the scoop is inverted and drawn, edge 22a foremost, through the ice cream. Edge 22a severs the ice cream from the mass, its thinness aiding such action. The conduction of heat to edge 22a from the liquid chamber 20 to maintain a temperature above the melting point of the ice cream continues during this process. As cup portion 24 fills with ice cream, leading edge 22a is brought upwardly through the surface of the ice cream, the bowl then being in the upright position. The liquid core contacting inner member 12 also maintains the surfaces of cup portion 24 at a temperature above the melting point of the ice cream, so that the surface of the ice cream in contact therewith is melted and does not adhere thereto. Thus the serving may be ejected from the scoop merely by inverting the scoop over the desired location. During the scooping operation, the cutaway portions 32 of flange portion 22 act to trim the edges of the rolling ball of ice cream formed in the cup portion 24, thereby controlling the size thereof and insuring accurate portion control. Moreover, the cutaway portions aid in the ejection of the serving by preventing vacuum locks which might cause sticking. The flatness of bottom 24a of cup portion 24 also aids in preventing such a vacuum, apparently because the generally spherical serving formed in the recess contacts the bottom portion only near its center, leaving an air pocket between the serving and the recess in the neighborhood of the curved corner portions 24b thereof.

As heat is conducted from the liquid, that portion in contact with the cup is chilled, and if it remained in contact with the cup, it might eventually reach a temperature below the melting point of ice cream to interfere with proper operation of the scoop. However, because of agitation of the liquid in normal operation, this agitation being enhanced by the hollow interior of handle 16 communicating with chamber 20, the liquid is continually in motion; the portion of liquid in contact with the cup is constantly recirculated to maintain a substantially constant temperature. Thus the temperature of the cup, including both the surfaces of cup portion 24 and the cutting edge 22a, is always maintained at a point above the melting point of ice cream; and the operation of the scoop will be as described above.

In Figure 3 there is illustrated a scoop made according to my invention which provides a conically shaped serving instead of the conventional spherical portion provided by the scoop illustrated in Figures 1 and 2. A bowl generally indicated at 38 has an inner member generally indicated at 40 and an outer cup 42 forming a chamber 44 therebetween which communicates with the hollow interior of a handle 46. Preferably member 40 has a generally cylindrical flange 50 with a cutting edge 50a and cutout side portions 52 serving functions similar to edge 22a and cutout portions 30 respectively (Figures 1 and 2). A frustro-conical cup portion 54, terminating in a lower spherical portion 54a and desirably inset from flange 50 by the thickness of the wall section of outer cup 42, has an annular groove (not shown) adjacent its juncture with flange 50. Outer cup 42, similar in function to cup 14, has a generally hemispheric bottom portion 42a merging into a generally cylindrical upper portion 42b, the upper edge of which is joined to cup 40 preferably by welding or swaging into the groove therein. Handle 46 is preferably secured to ferrule 42 by a nipple and O-ring assembly similar to that illustrated in Figure 2. The various components of the conical scoop may be formed of the same materials and in the same manner as the corresponding components of the scoop described above, and may be assembled by the same method. The operation of the scoop of Figure 3 is similar to that of the scoop of Figures 1 and 2, the liquid retained in chamber 44 serving to keep cutting edge 50a and conical cup portion 54 of member 40 above the melting point of ice cream to facilitate separating the serving from a mass of ice cream and ejecting the serving from the scoop, the serving in this case being conical in shape.

Thus I have described an improved ice cream scoop of the liquid core type which may be made of stainless steel or other materials, not attacked by the various substances to be found in ice cream or the like. These materials may be prepolished, thus saving the time-consuming and expensive polishing step necessary in the manufacture of cast scoops. The wall thicknesses of the cutting edge and the recess portion of the bowl containing the ice cream are thin to provide low weight and high heat conduction to facilitate cutting and serving from a mass of ice cream. I accomplish this by fashioning the bowl of the scoop from two interfitting cup-like members or elements, both of which may be formed in thin sections by such conventional methods as drawing, spinning, etc. As described above, the method of forming the parts and the method of their assembly are simple and may be performed without the use of highly skilled personnel and at low cost with low rejection rate.

The term "stainless steel" as used herein and in the claims is intended to include not only stainless steel but such other materials as chromium- or cadmium-plated brass and equivalent materials not attacked by substances present in ice cream nor reactive with most impurities which may be present in the liquid core.

It will thus be seen that the objects set forth above, among those made apparent from the preceding description, are efficiently attained and, since certain changes may be made in carrying out the above method and in the constructions set forth without departing from the scope of the invention, it is intended that all matter contained in the above description or shown in the accompanying drawing shall be interpreted as illustrative and not in a limiting sense.

It is also to be understood that the following claim is intended to cover all of the generic and specific features of the invention herein described, and all statements of the scope of the invention which, as a matter of language, might be said to fall therebetween.

I claim:

A scoop for ice cream or like material comprising, in combination, an outer cup member, a stainless steel inner member having a cup portion which has substantially the shape of an oblate hemispheroid and an integral upstanding flange portion attached to the rim of said cup portion, the cup portion of said inner member being nested within said outer cup member, the rim of said outer cup member and the line of junction of said cup portion and said flange portion of said inner member being circular in cross section, the outer diameter of said inner member at said line of junction being substantially the same as the inner diameter at the rim of said outer cup member, said cup portion of said inner member being shallower than said outer cup member, the inner edge of the rim of said outer cup member engaging said inner member along said line of junction to thereby form a liquid-containing chamber therebetween, means forming a liquid-tight seal at the line of engagement of said inner member and said outer cup member, and the outer diameter of said flange portion being the same as the outer diameter of the rim of said outer cup member, whereby the outside surface of said scoop is smooth and free from projections, said flange extending from said line of junction in a direction substantially opposite to said outer cup member and having two cut-out portions formed therein of a depth substantially equal to the height of said flange and located on opposite sides thereof to form two separate upstanding flanges on said scoop.

References Cited in the file of this patent

UNITED STATES PATENTS

| | | |
|---|---|---|
| 2,166,810 | Gammeter | July 18, 1939 |
| 2,210,623 | Kelly | Aug. 6, 1940 |
| 2,260,689 | Miller | Oct. 28, 1941 |
| 2,351,568 | Wheaton | June 13, 1944 |
| 2,630,082 | Prince | Mar. 3, 1953 |
| 2,761,399 | Gordon | Sept. 4, 1956 |